(12) United States Patent
Krishnamoorthy et al.

(10) Patent No.: US 10,098,165 B2
(45) Date of Patent: Oct. 9, 2018

(54) CALL SETUP IN WIRELESS COMMUNICATION DEVICES

(71) Applicant: QUALCOMM Incorporated, San Diego, CA (US)

(72) Inventors: Parthasarathy Krishnamoorthy, San Diego, CA (US); Muthukumaran Dhanapal, San Diego, CA (US); Shravan Kumar Raghunathan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 15/183,670

(22) Filed: Jun. 15, 2016

(65) Prior Publication Data

US 2017/0367125 A1 Dec. 21, 2017

(51) Int. Cl.
*H04W 76/10* (2018.01)
*H04L 12/26* (2006.01)
*H04W 36/00* (2009.01)
*H04W 68/02* (2009.01)
*H04W 76/38* (2018.01)
*H04W 76/27* (2018.01)

(52) U.S. Cl.
CPC ......... *H04W 76/10* (2018.02); *H04L 43/0876* (2013.01); *H04W 36/0022* (2013.01); *H04W 68/02* (2013.01); *H04W 76/38* (2018.02); *H04W 76/27* (2018.02)

(58) Field of Classification Search
CPC . H04W 76/02; H04W 36/0022; H04W 76/10; H04W 76/38; H04W 76/27; H04W 68/02; H04L 43/0876

USPC ........................................................ 455/458
See application file for complete search history.

(56) References Cited

U.S. PATENT DOCUMENTS

| | | | |
|---|---|---|---|
| 2012/0064885 A1 | 3/2012 | Ramachandran et al. | |
| 2013/0215834 A1* | 8/2013 | Deivasigamani | ... H04W 76/046 370/329 |
| 2016/0119896 A1* | 4/2016 | Jujaray | ................. H04W 68/02 455/458 |
| 2016/0134317 A1 | 5/2016 | Hu et al. | |
| 2016/0309407 A1* | 10/2016 | Ngai | ..................... H04W 48/18 |

OTHER PUBLICATIONS

International Search Report and Written Opinion—PCT/US2017/030827—ISA/EPO—dated Aug. 3, 2017.

* cited by examiner

*Primary Examiner* — Kamran Afshar
*Assistant Examiner* — Farid Seyedvosoghi
(74) *Attorney, Agent, or Firm* — Paradice and Li LLP

(57) ABSTRACT

Examples described herein relate to apparatuses and methods for managing connection of a wireless communication device, including, but not limited to, receiving, by the wireless communication device, a call setup page from a network while in a connected mode, determining whether a data inactivity duration exceeds a threshold upon receiving the call setup page, transmitting a Scheduling Request (SR) probe to the network in response to determining that the data inactivity duration exceeds the threshold, determining whether an uplink grant corresponding to the SR probe has been received, and performing a local connection release in response to determining that the uplink grant corresponding to the SR probe has not been received.

24 Claims, 6 Drawing Sheets

CALL SETUP IN WIRELESS COMMUNICATION DEVICES

BACKGROUND

A wireless communication device, such as a mobile phone device or a smart phone, may include two or more Subscriber Identity Modules (SIMs). Each SIM may correspond to at least one subscription via a Radio Access Technology (RAT). Such a wireless communication device may be a multi-SIM wireless communication device. In a Multi-SIM-Multi-Active (MSMA) wireless communication device, all SIMs may be active at the same time. In a Multi-SIM-Multi-Standby (MSMS) wireless communication device, if any one SIM is active, then the rest of the SIM(s) may be in a standby mode. The RATs may include, but are not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Wideband Code Division Multiple Access (WCDMA), Long Term Evolution (LTE), High-Speed Downlink Packet Access (HSDPA), and the like), Global System for Mobile Communications (GSM), Code Division Multiple Access 1× Radio Transmission Technology (1×), General Packet Radio Service (GPRS), Wi-Fi, Personal Communications Service (PCS), and other protocols that may be used in a wireless communications network or a data communications network.

A Concurrent RAT (CRAT) wireless communication device refers to a multi-SIM wireless communication device having two or more RATs concurrently enabled. With respect to a multi-SIM and CRAT wireless communication device, tune-aways (especially long tune-aways) from a first RAT (e.g., LTE) to a second RAT (e.g., GSM) can cause connection release messages associated with the first RAT to be missed. For example, during a tune-away interval to the second RAT, connection release messages (e.g., Over-the-Air (OTA) pages) of the first RAT may not be received given that RF resource of the wireless communication device has been tuned to the second RAT. This may cause a network (e.g., the first network) associated with the first RAT and the wireless communication device to be out of synch. For instance, the first network may set the wireless communication device to be in an idle state (e.g., a Radio Resource Control (RRC)-idle state/mode) in response to sending the connection release message. The wireless communication device, on the other hand, does not have knowledge of the connection release and remains in a connected mode (e.g., a RRC-connected state/mode) as the wireless communication device fails to receive the connection release message. The issue can be more severe in CRAT wireless communication devices due to frequent long tune-aways to the second RAT. Similar scenario may occur in a single-SIM wireless communication device as the single-SIM wireless communication device fails to decode the connection release message due to interference or fading.

Given that the first network sets the wireless communication device to be in the idle mode, the first network may transmit OTA pages to the wireless communication device for a call setup procedure such as, but not limited to, Circuit-Switch Fallback (CSFB) or Voice-over-LTE (VoLTE) procedures. The wireless communication device, upon receiving the OTA page, may ignore the OTA page because the wireless communication device is still set to be in the connected mode, indicating that a call setup is not necessary. This may lead to a dropped call, resulting in negative user experience.

SUMMARY

Aspects described herein relate to mechanisms for avoiding Circuit-Switch Fallback (CSFB) or Voice-over-LTE (VoLTE) call drops and improving page performance for multi-Subscriber Identity Module (SIM) wireless communication devices, Concurrent Radio Access Technology (CRAT) wireless communication devices, and single-SIM wireless communication devices. The mechanisms pertain to a scenario in which a multi-SIM or CRAT wireless communication may have missed a connection release Over-the-Air (OTA) message from a first network associated with a first Radio Access Technology (RAT) due to tune-away to a second RAT. The mechanisms also pertain to a scenario in which a single-SIM wireless communication device may have missed a connection release OTA message from a network due to interference or fading.

In some aspects, a method for managing connection of a wireless communication device includes receiving, by the wireless communication device, a call setup page from a network while in a connected mode, determining whether a data inactivity duration exceeds a threshold upon receiving the call setup page, transmitting a Scheduling Request (SR) probe to the network in response to determining that the data inactivity duration exceeds the threshold, determining whether an uplink grant corresponding to the SR probe has been received, and performing a local connection release in response to determining that the uplink grant corresponding to the SR probe has not been received.

In some aspects, the method further includes storing the call setup page in response to determining that the data inactivity duration exceeds the threshold, and performing a call setup procedure based on the stored call setup page in response to determining that an uplink grant has not been received.

In various aspects, the call setup page is a Circuit Switch (CS) page. The call setup procedure is at least one of a Circuit-Switch Fallback (CSFB) call procedure or Voice-over-LTE (VoLTE) call procedure.

In some aspects, the method further includes setting the call setup page as FALSE in response to determining that the data inactivity duration does not exceed the threshold.

In some aspects, the method further includes setting the call setup page as FALSE in response to determining that an uplink grant corresponding to the SR probe has been received.

In some aspects, the method further includes setting a SR count as a new SR count in response to transmitting the SR probe.

In some aspects, the wireless communication device is one of a multi-SIM wireless communication device, CRAT wireless communication device, or single-SIM wireless communication device.

In some aspects, the wireless communication device is a multi-SIM wireless communication device or a CRAT wireless communication device. In some aspects, the wireless communication device has a first RAT associated with a first network and a second RAT associated with a second network. In some aspects, the call setup page is associated with the first RAT. In some aspects, the network is the first network.

In some aspects, the method further includes tuning away from the first RAT to the second RAT, tuning back from the second RAT to the first RAT, and receiving the call setup page from the first network after tuning back from the second RAT.

In some aspects, the method further includes failing to receive a connection release OTA message from the first network while the wireless communication device is tuned away to the second RAT.

In some aspects, the wireless communication device is a single-SIM wireless communication device, and the method further includes failing to receive a connection release OTA message from the network due to interference or fading.

In some aspects, the threshold is different based on whether the wireless communication device is the multi-SIM wireless communication device, CRAT wireless communication device, or single-SIM wireless communication device.

In some aspects, the method further includes determining whether the uplink grant corresponding to the SR probe has been received. In some aspects, determining whether the data inactivity duration exceeds the threshold includes checking, with a Radio Resource Control (RRC) layer, the data inactivity duration maintained by a Media Access Control (MAC) layer. Transmitting the SR probe includes configuring, with the MAC layer, a Radio Frequency (RF) resource to send the SR probe.

In some aspects, the method further includes caching, by a RRC layer, the call setup page in response to determining that the data inactivity duration exceeds the threshold, forwarding, by the RRC layer, the call setup page to a Non-Access Stratum (NAS) layer, and configuring, by the NAS layer, a RF resource to perform a call setup procedure.

According to various aspects, a wireless communication device includes a RF resource, a memory, a processor configured to receive a call setup page from a network while in a connected mode, transmit a SR probe to the network in response to determining that a data inactivity duration exceeds the threshold upon receiving the call setup page, and perform a local connection release in response to determining that an uplink grant corresponding to the SR probe has not been received.

In some aspects, the processor is further configured to store the call setup page in response to determining that the data inactivity duration exceeds the threshold, and perform a call setup procedure based on the stored call setup page in response to determining that an uplink grant has not been received.

In some aspects, the call setup page is a CS page, and the call setup procedure is at least one of a CSFB call procedure or VoLTE call procedure.

In some aspects, the processor is further configured to set the call setup page as FALSE in response to determining that the data inactivity duration does not exceed the threshold.

In some aspects, the processor is further configured to set the call setup page as FALSE in response to determining that an uplink grant corresponding to the SR probe has been received.

In some aspects, the processor is further configured to set a SR count as a new SR count in response to transmitting the SR probe.

In some aspects, the wireless communication device is one of a multi-SIM wireless communication device, CRAT wireless communication device, or single-SIM wireless communication device.

In some aspects, the wireless communication device is a multi-SIM wireless communication device or a CRAT wireless communication device, the wireless communication device further includes a first SIM associated with a first RAT of a first network and a second SIM associated with a second RAT of a second network, the call setup page is associated with the first RAT, and the network is the first network.

In some aspects, the processor is further configured to tune away from the first RAT to the second RAT, tune back from the second RAT to the first RAT, and receive the call setup page from the first network after tuning back from the second RAT.

In some aspects, a connection release Over-the-Air message from the first network has not been received by the RF resource while the wireless communication device is tuned away to the second RAT.

In some aspects, the wireless communication device is a single-SIM wireless communication device, and a connection release Over-the-Air message from the network has not been received by the RF resource due to interference or fading.

In some aspects, the threshold is different based on whether the wireless communication device is the multi-SIM wireless communication device, CRAT wireless communication device, or single-SIM wireless communication device.

In some aspects, the processor is configured to determine whether the data inactivity duration exceeds the threshold, and determine whether the uplink grant corresponding to the SR prove has been received, by checking, with a RRC layer implemented by the processor, the data inactivity duration maintained by a MAC layer implemented by the processor, and transmit, via the RF resource configured by the MAC layer, the SR probe.

In some aspects, the processor is further configured to cache, by a RRC layer implemented by the processor, the call setup page in response to determining that the data inactivity duration exceeds the threshold, forward, by the RRC layer, the call setup page to a NAS layer implemented by the processor, and configure the RF resource, with the NAS layer, to perform a call setup procedure.

In some aspects, a wireless communication device includes means for receiving a call setup page from a network while in a connected mode, means for transmitting a SR probe to the network in response to determining that a data inactivity duration exceeds the threshold upon receiving the call setup page, and means for performing a local connection release in response to determining that an uplink grant corresponding to the SR probe has not been received.

According some embodiments, a non-transitory computer-readable medium containing processor-readable instructions such that, when executed, causes a processor of a multi-SIM device to receive, by the wireless communication device, a call setup page from a network while in a connected mode, determine whether a data inactivity duration exceeds a threshold upon receiving the call setup page, transmit a Scheduling Request (SR) probe to the network in response to determining that the data inactivity duration exceeds the threshold, determine whether an uplink grant corresponding to the SR probe has been received, and perform a local connection release in response to determining that the uplink grant corresponding to the SR probe has not been received.

BRIEF DESCRIPTION OF THE DRAWINGS

The accompanying drawings, which are incorporated herein and constitute part of this specification, illustrate exemplary examples of the disclosure, and together with the general description given above and the detailed description given below, serve to explain the features of the various examples.

DETAILED DESCRIPTION

Figure 1:
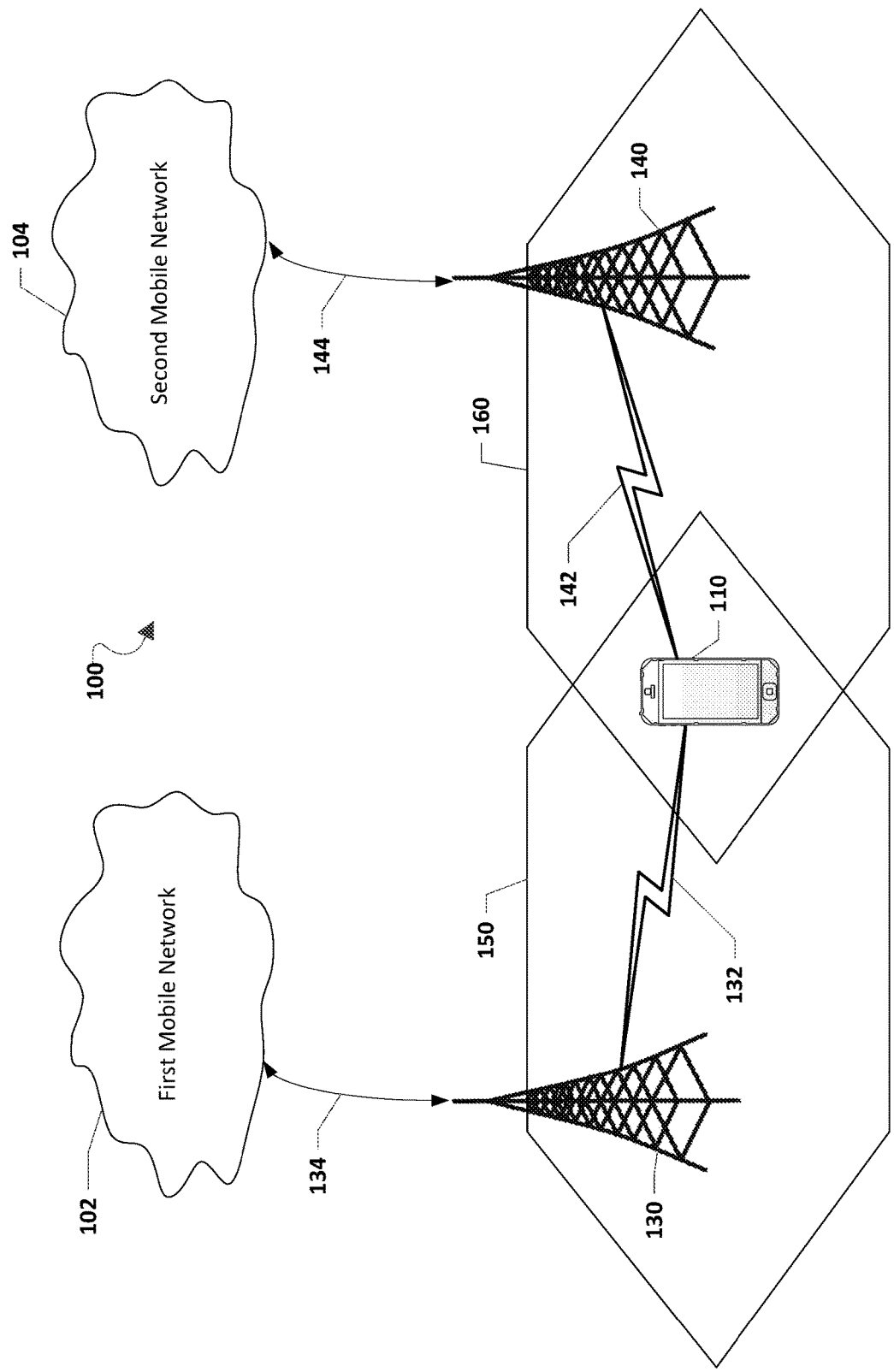
FIG. 1 is a schematic diagram of a communication system in accordance with various examples.

Various examples will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

Some modern communication devices, referred to herein as a wireless communication device, User Equipment (UE), or Mobile Station (MS), may include any one or all of cellular telephones, smart phones, personal or mobile multimedia players, personal data assistants, laptop computers, personal computers, tablet computers, smart books, palm-top computers, wireless electronic mail receivers, multimedia Internet-enabled cellular telephones, wireless gaming controllers, appliances, automobiles, and similar personal electronic devices. Such a wireless communication device may include at least one Subscriber Identity Module (SIM), a programmable processor, memory, and circuitry for connecting to two or more mobile communication networks.

A wireless communication device may include one or more SIMs that provide users of the wireless communication devices with access to one or multiple separate mobile communication networks. The mobile communication networks may be supported by Radio Access Technologies (RATs). The wireless communication device may be configured to connect to one or more base stations via one or more RATs. Examples of RATs may include, but not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Wideband Code Division Multiple Access (WCDMA), Long Term Evolution (LTE), High-Speed Downlink Packet Access (HSDPA), and the like), Global System for Mobile Communications (GSM), Code Division Multiple Access 1× Radio Transmission Technology (1×), General Packet Radio Service (GPRS), Wi-Fi, Personal Communications Service (PCS), and other protocols that may be used in a wireless communications network or a data communications network. Each RAT may be associated with a subscription or SIM.

A wireless communication device provided with a plurality of SIMs and connected to two or more subscriptions or networks with one subscription or network being active at a given time is a Multi-SIM-Multi-Standby (MSMS) communication device. In one example, the MSMS communication device may be a Dual-SIM-Dual-Standby (DSDS) communication device, which may include two SIMs that may both be active on standby, but one is deactivated when the other one is in use. In another example, the MSMS communication device may be a Triple-SIM-Triple-Standby (TSTS) communication device, which includes three SIMs that may all be active on standby, where two may be deactivated when the third one is in use. In other examples, the MSMS communication device may be other suitable multi-SIM communication devices, with, for example, four or more SIMs, such that when one is in use, the others may be deactivated.

On the other hand, a wireless communication device that includes a plurality of SIMs and connects to two or more subscriptions or networks with two or more subscriptions or networks being active at a given time may be a MSMA communication device. An example MSMA communication device may be a Dual-SIM-Dual-Active (DSDA) communication device, which may include two SIMs. Both SIMs may remain active. In another example, the MSMA device may be a Triple-SIM-Triple-Active (TSTA) communication device, which may include three SIM. All three SIMs may remain active. In other examples, the MSMA communication device may be other suitable multi-SIM communication devices with four or more SIMs, all of which may be active.

Generally, examples described herein may be applicable to a MSMS wireless communication device having at least a first SIM and a second SIM. Illustrating with a non-limiting example, the first SIM may be associated with a first subscription via a first RAT, and the second SIM may be associated with a second subscription via a second RAT. The examples may also be applicable to a MSMA wireless communication device that halts communication activities over the first RAT due to blanking pattern, power back-off, interference, and/or the like as communication activities (such as, but not limited to, pages) are received or transmitted over the second RAT. Examples described herein may likewise be applicable to Concurrent RAT (CRAT) wireless communication devices. In addition, examples may further be applicable to single-SIM wireless communication devices.

As used herein, the terms "SIM," "SIM card," and "subscriber identification module" may be used interchangeably to refer to a memory that may be an integrated circuit or embedded into a removable card, and that stores an International Mobile Subscriber Identity (IMSI), related key, and/or other information used to identify and/or authenticate a wireless device on a network and enable communication services with the network. Because the information stored in a SIM may be used by the wireless device for establishing a communication link for a particular communication service with a particular network, the term "SIM" may also be used herein as a shorthand reference to the communication service (e.g., the networks, the subscriptions, the services, and/or the like) associated with and enabled by the information (e.g., in the form of various parameters) stored in a particular SIM as the SIM and the communication network, as well as the services and RATs supported by that network, correlate to one another.

A wireless communication device (e.g., a multi-SIM, CRAT, or single-SIM wireless communication device) may receive a page (e.g., a Circuit Switch (CS) page) for a call setup (e.g., for Circuit-Switch Fallback (CSFB) or Voice-over-LTE (VoLTE) call procedures) while the wireless communication device is in a Radio Resource Control (RRC)-connected mode. Conventionally, the wireless communication device may ignore the call setup page (e.g., by designating the call setup page as FALSE, given that the wireless communication device is still in the RRC-connected mode).

In some examples, instead of ignoring the call setup page received while the wireless communication device is in a RRC-connected mode, the wireless communication device may determine a length of a uplink and downlink data inactivity duration. As used herein, the "data inactivity duration" refers to an interval of time in which no uplink and downlink data has been communicated. In response to determining that the length of the data inactivity duration exceeds a threshold, the wireless communication device may cache the call setup page and transmit a Scheduling Request (SR) probe to a first network associated with the first RAT requesting an uplink grant. The SR count may be set to be a new SR count ($S_{new}$).

In response to determining an uplink grant corresponding to the SR probe has not be received from the first network, the wireless communication device may perform a local RRC connection release procedure to locally release the RRC connection. The wireless communication device may then be in a RRC-idle mode. The wireless communication device may use the cached call setup page to perform a call setup procedure (e.g., a CSFB or VoLTE call procedure). On the other hand, in response to receiving an uplink grant from the network, the wireless communication device may remain in the RRC-connected mode and ignore the call setup page.

Various examples may be implemented within a communication system 100, an example of which is illustrated in FIG. 1. Referring to FIG. 1, a first mobile network 102 and a second mobile network 104 may each be associated with a plurality of cellular base stations (e.g., a first base station 130 and a second base station 140, respectively). The first base station 130 may be broadcasting to the first mobile network 102 in a first serving cell 150. The second base station 140 may be broadcasting to the second mobile network 104 in a second serving cell 160. A wireless communication device 110 may be associated with (within effective boundaries of) both the first serving cell 150 and the second serving cell 160.

The wireless communication device 110 may be in communication with the first mobile network 102 through a first cellular connection 132 to the first base station 130. The first cellular connection 132 may correspond to the first RAT of the wireless communication device 110. The wireless communication device 110 may also be in communication with the second mobile network 104 through a second cellular connection 142 to the second base station 140. The second cellular connection 142 may correspond to the second RAT of the wireless communication device 110, as in a multi-SIM context. The first base station 130 may be in communication with the first mobile network 102 over a wired or wireless connection 134. The second base station 140 may be in communication with the second mobile network 104 over a wired or wireless connection 144.

The first cellular connection 132 and the second cellular connection 142 may be made through two-way wireless communication links. Each of the wireless communication links may be enable by any suitable protocol including, but not limited to, FDMA, TDMA, CDMA (e.g., EVDO), UMTS (e.g., WCDMA, LTE, HSDPA, or the like), GSM, 1×, GPRS, Wi-Fi, PCS, and/or another protocol used in a wireless communications network or a data communications network. By way of illustrating with a non-limiting example, the first cellular connection 132 may be an LTE connection. The second cellular connection 142 may be a GSM connection or any other suitable connection such as, but not limited to, LTE, WCDMA, HSDPA, EVDO, or the like.

Each of the first base station 130 and the second base station 140 may include at least one antenna group or transmission station located in the same or different areas. The at least one antenna group or transmission station may be associated with signal transmission and reception. Each of the first base station 130 and the second base station 140 may include one or more processors, modulators, multiplexers, demodulators, demultiplexers, antennas, and the like for performing the functions described herein. In some examples, the first base station 130 and the second base station 140 may be an access point, Node B, evolved Node B (eNodeB or eNB), base transceiver station (BTS), or the like.

In various examples, the wireless communication device 110 may be configured to access the first mobile network 102 and the second mobile network 104 by virtue of the multi-SIM and/or the multi-mode SIM configuration of the wireless communication device 110 (e.g., via the first cellular connection 132 and the second cellular connection 142). When a SIM corresponding to a RAT is inserted, the wireless communication device 110 may access the mobile communication network associated with that RAT based on the information stored on the SIM through registrations and call setups.

While the wireless communication device 110 is shown connected to the mobile networks 102 and 104 via two cellular connections, in other examples (not shown), the wireless communication device 110 may establish additional network connections using at least one additional RAT.

In some examples, the wireless communication device 110 may establish a wireless connection with a peripheral device (not shown) used in connection with the wireless communication device 110. For example, the wireless communication device 110 may communicate over a Bluetooth® link with a Bluetooth-enabled personal computing device (e.g., a "smart watch"). In some examples, the wireless communication device 110 may establish a wireless connection with a wireless access point (not shown), such as over a Wi-Fi connection. The wireless access point may be configured to connect to the Internet or another network over a wired connection.

Figure 2:
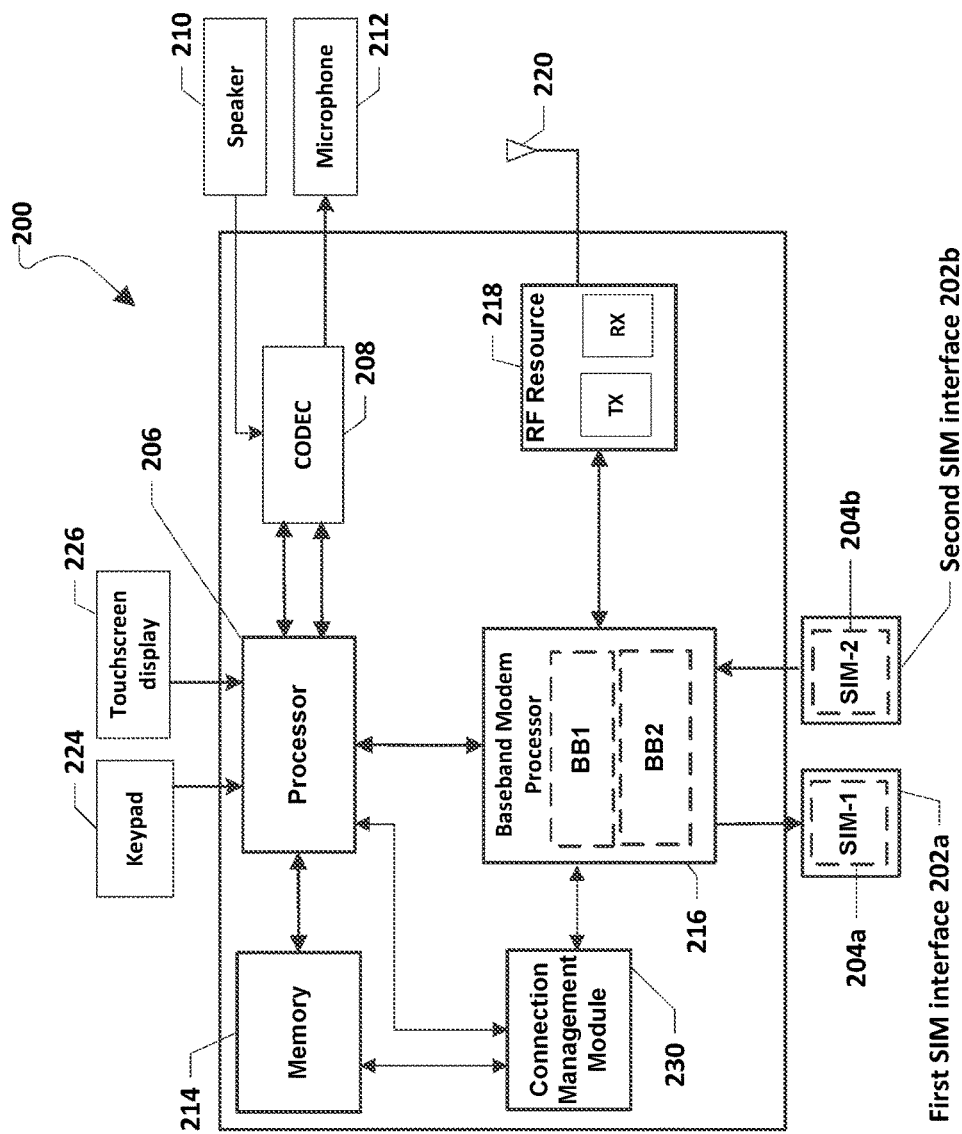
FIG. 2 is a component block diagram of an example of a wireless communication device according to various examples.

FIG. 2 is a functional block diagram of a wireless communication device 200 suitable for implementing various examples. According to various examples, the wireless communication device 200 may be the wireless communication device 110 as described with reference to FIG. 1. Referring to FIGS. 1-2, the wireless communication device 200 may include a first SIM interface 202a, which may receive a first identity module SIM-1 204a that is associated with the first mobile network 102. The wireless communication device 200 may also include a second SIM interface 202b, which may receive a second identity module SIM-2 204b that is associated with the second mobile network 104.

A SIM (e.g., SIM-1 204a, SIM-2 204b, and/or the like) in various examples may be a Universal Integrated Circuit Card (UICC) that is configured with SIM and/or Universal SIM (USIM) applications, enabling access to GSM and/or UMTS networks. The UICC may also provide storage for a phone book and other applications. Alternatively, in a CDMA network, a SIM may be a UICC removable user identity module (R-UIM) or a CDMA Subscriber Identity Module (CSIM) on a card. A SIM card may have a Central Processing Unit (CPU), Read Only Memory (ROM), Random Access Memory (RAM), Electrically Erasable Programmable Read-Only Memory (EEPROM) and Input/Output (I/O) circuits. An Integrated Circuit Card Identity (ICCID) SIM serial number may be printed on the SIM card for identification. However, a SIM may be implemented within a portion of memory of the wireless communication device 200, and thus need not be a separate or removable circuit, chip, or card.

A SIM used in various examples may store user account information, an IMSI, a set of SIM Application Toolkit (SAT) commands, and other network provisioning information, as well as provide storage space for phone book database of the user's contacts. As part of the network provisioning information, a SIM may store home identifiers (e.g., a System Identification Number (SID)/Network Identification Number (NID) pair, a Home PLMN (HPLMN) code, etc.) to indicate the SIM card network operator provider.

The wireless communication device 200 may include at least one controller, such as a general-purpose processor 206, which may be coupled to a coder/decoder (CODEC) 208. The CODEC 208 may in turn be coupled to a speaker 210 and a microphone 212. The general-purpose processor 206 may also be coupled to at least one memory 214. The general-purpose processor 206 may include any suitable data processing device, such as a microprocessor. In the alternative, the general-purpose processor 206 may be any suitable electronic processor, controller, microcontroller, or state machine. The general-purpose processor 206 may also be implemented as a combination of computing devices (e.g., a combination of a Digital Signal Processor (DSP) and a microprocessor, a plurality of microprocessors, at least one microprocessor in conjunction with a DSP core, or any other such configuration).

The memory 214 may be a non-transitory processor-readable storage medium that stores processor-executable instructions. For example, the instructions may include routing communication data relating to the first or second subscription though a corresponding baseband-RF resource chain. The memory 214 may include any suitable internal or external device for storing software and data. Examples of the memory 214 may include, but are not limited to, RAM, ROM, floppy disks, hard disks, dongles or other Recomp Sensor Board (RSB) connected memory devices, or the like. The memory 214 may store an Operating System (OS), user application software, and/or executable instructions. The memory 214 may also store application data, such as an array data structure.

The general-purpose processor 206 and the memory 214 may each be coupled to baseband modem processor 216. The SIMs (e.g., the SIM-1 204a, the SIM-2 204b, and/or the like) in the wireless communication device 200 may be associated with at least one baseband-RF resource chain. A baseband-RF resource chain may include the baseband modem processor 216, which may perform baseband/modem functions for communications on the SIMs. The baseband modem processor 216 may include one or more amplifiers and radios, referred to generally herein as a RF resource 218 or RF chain.

The RF resource 218 may include at least one transceiver that perform transmit/receive functions for the associated SIMs 204a and 204b of the wireless communication device 200. The RF resource 218 may include separate transmit and receive circuitry, or may include a transceiver that combines transmitter and receiver functions. The RF resource 218 may be coupled to a wireless antenna 220. The RF resource 218 may also be coupled to the baseband modem processor 216.

The examples described herein may be applicable to MSMS wireless communication devices in which the SIMs 204a and 204b share a common set of RF resource (particularly, the RF resource 218). Examples described herein may be applicable to CRAT wireless communication devices having a shared RF resource. Examples described herein may be applicable to wireless communication devices in which each of the SIMs 204a and 204b has a separate RF resource, but activities of one of the SIMs 204a and 204b may be deactivated while the other one of the SIMs 204a and 204b is active.

In some examples, the general-purpose processor 206, the memory 214, the baseband modem processor 216, and the RF resource 218 may be included in the wireless communication device 200 as a system-on-chip. In some examples, the SIMs 204a and 204b and their corresponding interfaces 202a, 202b may be external to the system-on-chip. Further, various input and output devices may be coupled to components on the system-on-chip, such as interfaces or controllers. Example user input components suitable for use in the wireless communication device 200 may include, but are not limited to, a keypad 224, a touchscreen display 226, and the microphone 212.

In some examples, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or to receive a telephone number. As another example, the request to initiate the outgoing call may be in the form of a voice command received via the microphone 212. Interfaces may be provided between the various software modules and functions in the wireless communication device 200 to enable communication between them.

The wireless communication device 200 may include a connection management module 230. The connection management module 230 or the general-purpose processor 206 may configure the wireless communication device 200 to implement various software layers. For example, the connection management module 230 or the general-purpose processor 206 may implement a Media Access Control (MAC) layer, Radio Link Control (RLC) layer, Non-Access Stratum (NAS) layer, and/or the like.

In some examples, the connection management module 230 may be implemented within the general-purpose processor 206. For example, the connection management module 230 may be implemented as a software application stored within the memory 214 and executed by the general-purpose processor 206. Accordingly, such examples can be implemented with minimal additional hardware costs. However, other examples relate to systems and processes implemented with dedicated hardware specifically configured for performing operations described herein with respect to the connection management module 230. For example, the connection management module 230 may be implemented as a separate processing component (i.e., separate from the general-purpose processor 206). The connection management module 230 may be coupled to the memory 214, the general processor 206, the baseband processor 216, and/or the RF resource 218 for performing the function described herein.

Hardware and/or software for the functions may be incorporated in the wireless communication device 200 during manufacturing, for example, as a part of a configuration of an original equipment manufacturer (OEM) of the wireless communication device 200. In further examples, such hardware and/or software may be added to the wireless communication device 200 post-manufacture, such as by installing one or more hardware devices and/or software applications onto the wireless communication device 200.

In some examples, the wireless communication device 200 may include, among other things, additional SIM cards, SIM interfaces, at least another RF resource associated with the additional SIM cards, and additional antennas for connecting to additional mobile networks.

Figure 3:
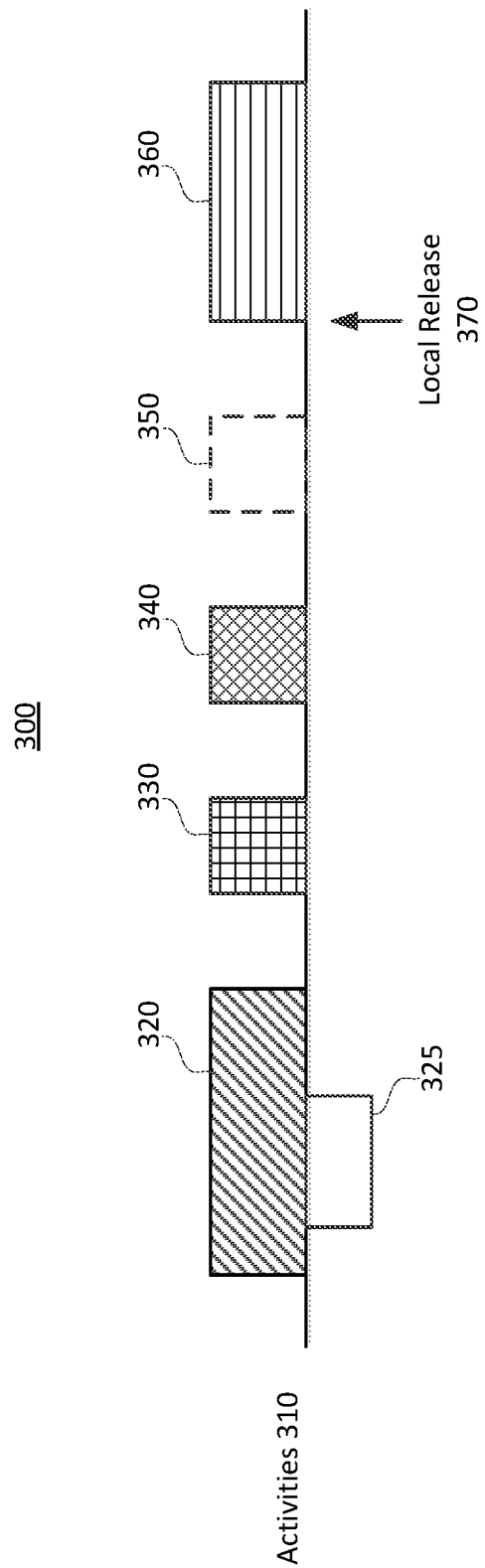
FIG. 3 is a block diagram illustrating an example of activities of the RF resource according to some examples.
Figure 4:
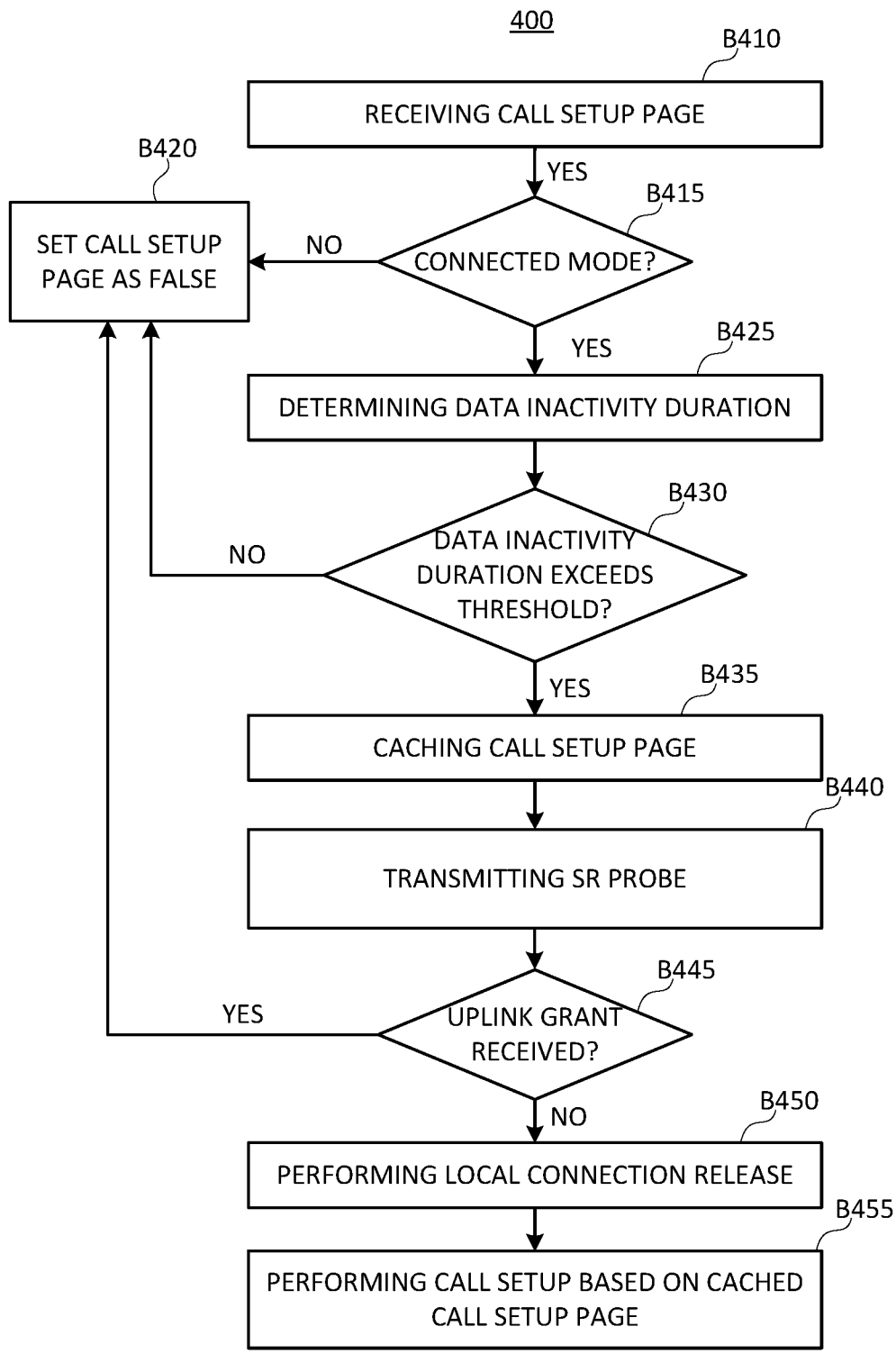
FIG. 4 is a flow diagram illustrating an example of a connection management method according to some examples.

FIG. 3 is a block diagram illustrating an example of activities 310 of the RF resource 218 according to some examples. FIG. 4 is a flow diagram illustrating an example of a connection management method 400 according to some examples. Referring to FIGS. 1-4, the connection management method 400 may be performed by at least the connection management module 230 and/or the general-purpose processor 206 in some examples. The wireless communication device 200 may be a multi-SIM device or a CRAT device (in which the first RAT and the second RAT share the RF resource 218).

A tune-away interval 320 refers to duration of time in which the RF resource 218 may be tuned away from the first RAT associated with SIM-1 204a to the second RAT associated with SIM-2 204b. At least one connection release Over-the-Air (OTA) message 325 may collide or overlap with the tune-away interval 320 in time, resulting in failure to receive and/or decode the connection release OTA message 325. Due to the failure to receive and/or decode the connection release OTA message 325, the connection management module 230 and/or the general-purpose processor 206 may not have appropriately set the mode (e.g., the mode may be a connected mode or an idle mode) with respect to the wireless communication device 200. For instance, the mode for the wireless communication device 200 may still be set to be in a connected mode (e.g., a RRC-connected mode) even though the first mobile network 102 had already sent the connection release OTA message 325, which would have triggered connection release at the wireless communication device if message 325 was received and decoded successfully. After sending the connection release OTA message 325, the first mobile network 102 may associate the wireless communication device 200 with an idle mode (e.g., a RRC-idle mode), thus resulting in a mode mismatch between the first mobile network 102 and the wireless communication device 200.

Referring now to both FIGS. 3 and 4, after the RF resource 218 is tuned back to the first RAT, a call setup page 330 may be received from the first mobile network 102 (e.g., from the first base station 130) via the RF resource 218, at block B410. The call setup page 330 may be a CS page for a call setup procedure such as, but not limited to, a CSFB call procedure, VoLTE call procedure, or the like. In response to receiving the call setup page 330, the connection management module 230 and/or the general-purpose processor 206 may determine whether the wireless communication device 200 is set to be in the connected mode, at block B415.

In response to determining that the wireless communication device 200 is not in the connected mode (e.g., the wireless communication device 200 is in the idle mode) (B415:NO), the connection management module 230 and/or the general-purpose processor 206 may set the call setup page 330 as FALSE, at block B420. That is, the connection management module 230 and/or the general-purpose processor 206 may disregard the call setup page 330 as a false alarm. Thus, the wireless communication device 200 may remain in the idle mode.

On the other hand, in response to determining that the wireless communication device 200 is in the connected mode (415:YES), the connection management module 230 and/or the general-purpose processor 206 may determine a data inactivity duration at block B425. The data inactivity duration may correspond to an interval of time in which no uplink and downlink data has been communicated via the first RAT. The data inactivity duration may include at least the tune-away interval 320. Illustrating with a non-limiting example, the RRC layer (implemented by the connection management module 230 and/or the general-purpose processor 206) may send a request to the MAC layer to obtain the data inactivity duration maintained by the MAC layer. In response to the request, the MAC layer may send the data inactivity duration to the RRC layer for processing.

At block B430, the connection management module 230 and/or the general-purpose processor 206 may determine whether the data inactivity duration exceeds a threshold ($T_d$) in some examples. Illustrating with a non-limiting example, the threshold may be 50 ms, 100 ms, 200 ms, 300 ms, or the like for a multi-SIM/CRAT device (e.g., the wireless communication device 200). The threshold may be different for a multi-SIM/CRAT device as compared to a single-SIM device. For instance, the threshold may be shorter for a single-SIM device as compared to that of a multi-SIM/CRAT device.

Comparing the data inactivity duration with the threshold may reveal a likelihood of the first mobile network 102 designating the wireless communication device 200 to be in the connected mode or the idle mode. For instance, if the data inactivity duration exceeds the threshold, the connection management module 230 and/or the general-purpose processor 206 may determine that the call setup page 330 is unlikely to be a false alarm. On the other hand, if the data inactivity duration does not exceed the threshold, the connection management module 230 and/or the general-purpose processor 206 may determine that the call setup page 330 is likely to be false alarm.

In response to determining that the length of the data inactivity duration does not exceed the threshold (B430:NO), the connection management module 230 and/or the general-purpose processor 206 may set the call setup page 330 as FALSE, at block B420. The wireless communication device 200 may remain in the connected mode.

On the other hand, in response to determining that the data inactivity duration exceeds the threshold (B430:YES), the connection management module 230 and/or the general-purpose processor 206 may cache or otherwise store the call setup page 330 in the memory 214 or another suitable memory device, at block B435. For instance, the RRC layer may cache the call setup page 330.

At block B440, the connection management module 230 and/or the general-purpose processor 206 may configure the RF resource 218 to transmit a SR probe 340 to the first mobile network 102 (e.g., the first base station 130) in some examples. The SR probe 340 may be a request to the first mobile network 102 for an uplink grant. In some examples, the SR probe 340 may be transmitted in response to the determination that the data inactivity duration exceeds the threshold (B430:YES). In other examples, the SR probe 340 may be transmitted in response to caching the call setup page 330. Consequently, block B445 may be executed either before block B440 (not shown in FIG. 4) or after block B440 (shown in FIG. 4). The MAC layer may configure the RF resource 218 to transmit the SR probe 340.

In some examples, the connection management module 230 and/or the general-purpose processor 206 may set the SR count to be a new SR count ($S_{new}$). The new SR count may be lower than an actual SR count which takes into account the SR probes (such as, but not limited to, the SR probe 340) sent for the purpose of testing whether the first mobile network 102 would allow an uplink grant.

In some examples, the new SR count may ignore the effect of SR probes (such as, but not limited to, the SR probe 340) sent for the purpose of testing whether the first mobile network 102 would allow an uplink grant. Illustrating with a non-limiting example, before at least one SR probe 340 is sent, the SR count may be n. After x number of SR probes (e.g., the SR probe 340) are transmitted, the actual SR count may be n+x, but the new SR count may be n.

In other examples, the new SR count may devalue the effect of the SR probes sent for the purpose of testing whether the first mobile network 102 would allow an uplink grant. Illustrating with a non-limiting example, before at least one SR probe 340 is sent, the SR count may be n. After x number of SR probes (e.g., the SR probe 340) are transmitted, the actual SR count may be n+x, but the new SR count may be n+x/A, where A is a number greater than 1.

At block B445, the connection management module 230 and/or the general-purpose processor 206 may determine whether an uplink grant 350 has been received from the first mobile network 102 (e.g., from the first base station 130) in some examples. The uplink grant 350 (if received) may correspond to the SR probe 340. For instance, the connection management module 230 and/or the general-purpose processor 206 may determine whether the RF resource 218 receives any uplink grant within a period of time. Illustrating with a non-limiting example, the period of time may be 10 ms, 20 ms, 25 ms, or the like. Receiving the uplink grant 350 from the first mobile network 102 may indicate that the first mobile network 102 still associates the wireless communication device 200 with the connected mode, such that allocating uplink grants is appropriate for connected devices.

On the other hand, the first mobile network 102 would have disregarded the SR probe 340 if the first mobile network 102 associates the wireless communication device 200 with the idle mode. Thus, not receiving any uplink grant from the first mobile network 102 may indicate that the first mobile network 102 associates the wireless communication device 200 with the idle mode.

In response to determining that the uplink grant 350 has been received (B445:YES), the connection management module 230 and/or the general-purpose processor 206 may set the call setup page 330 as FALSE, at block B420. Thus, the wireless communication device 200 may remain in the connected mode. On the other hand, in response to determining that the no uplink grant has been received that corresponds to the SR probe 340, the connection management module 230 and/or the general-purpose processor 206 may perform a local connection release 370 (e.g., a local RRC connection release) at block B450. For instance, the RRC layer may perform the local connection release 370 procedure. The local connection release 370 may allow the connection management module 230 and/or the general-purpose processor 206 to locally set the wireless communication device 200 to be in the idle mode.

At block B455, the connection management module 230 and/or the general-purpose processor 206 may perform a call setup based on the cached call setup page 330. For instance, the RRC layer may forward the cached call setup page 330 to the NAS layer for performing the call setup. The call setup may be a CSFB call procedure, VoLTE call procedure, or the like. In some examples, the connection management module 230 and/or the general-purpose processor 206 may perform the call setup in response to performing the local connection release 370. In other examples, the connection management module 230 and/or the general-purpose processor 206 may perform the call setup in response to determining that no uplink grant has been received (B445:NO). In other words, block B455 may be executed either immediately subsequent to block B445 (not shown in FIG. 4) or subsequent to block B450 (shown in FIG. 4).

Figure 5:
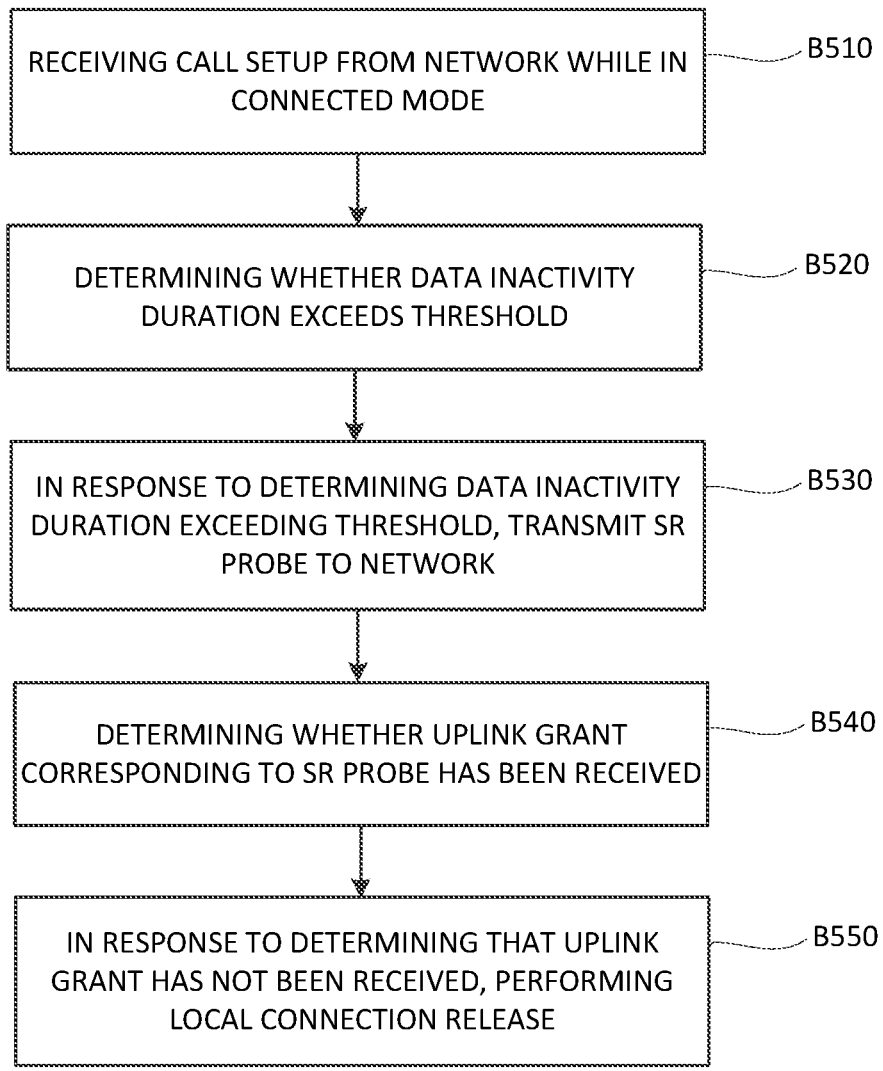
FIG. 5 is a flow diagram illustrating an example of a connection management method according to some examples.

FIG. 5 is a flow diagram illustrating an example of a connection management method 500a according to some examples. Referring to FIGS. 1-5, each of blocks B510-B550 may correspond to one or more of blocks B410-B455.

At block B510, the RF resource 218 may receive the call setup page 330 from the first mobile network 102 while in the connected mode. At block B520, the connection management module 230 and/or the general-purpose processor 206 may determine whether the data inactivity duration exceeds the threshold ($T_d$).

In response to determining that the data inactivity duration exceeds the threshold, the connection management module 230 and/or the general-purpose processor 206 may configure the RF resource 218 to transmit the SR probe 340 to the first mobile network 102, at block B530. At block B540, the connection management module 230 and/or the general-purpose processor 206 may determine whether an uplink grant corresponding to the SR probe 340 has been received. In response to determining that an uplink grant corresponding to the SR probe 340 has not been received, the connection management module 230 and/or the general-purpose processor 206 may be configured to perform the local connection release 370, at block B550.

While FIGS. 3-5 are described with respect to the multi-SIM or CRAT wireless communication device 200, FIGS. 3-5 can also be applicable to single-SIM wireless communication devices. For instance, the tune-away interval 320 may correspond to any interval of interference or fading that causes failure to receive or decode the connection release OTA message 325.

Figure 6:
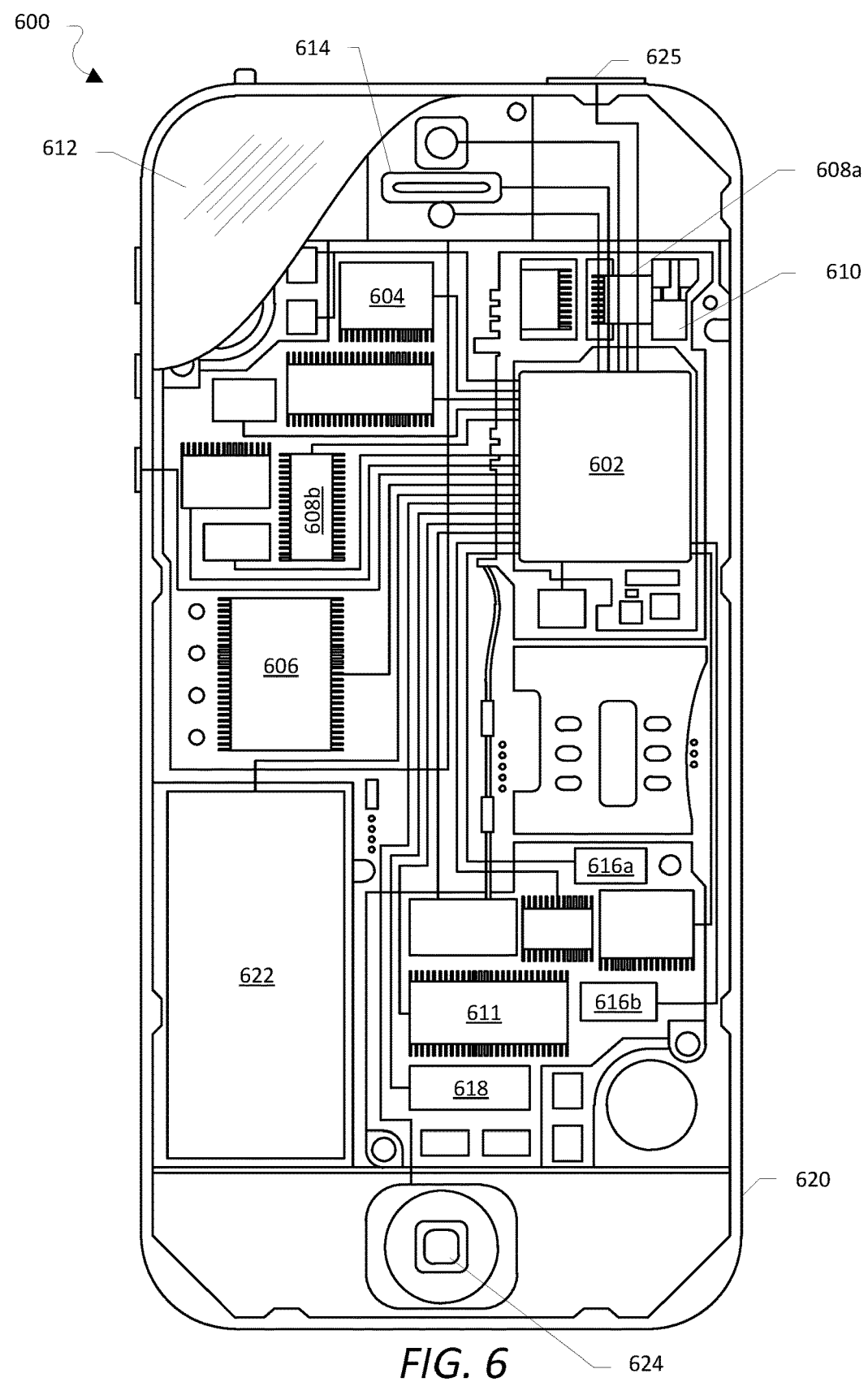
FIG. 6 is a component block diagram of a wireless communication device suitable for use with various examples.

The various examples may be implemented in any of a variety of wireless communication devices 110 and 200, an example of which is illustrated in FIG. 6, as wireless communication device 600. As such, the wireless communication device 600 may implement the process and/or the apparatus of FIGS. 1-5, as described herein.

With reference to FIGS. 1-6, the wireless communication device 600 may include a processor 602 coupled to a touchscreen controller 604 and an internal memory 606. The processor 602 may be one or more multi-core integrated circuits designated for general or specific processing tasks. The memory 606 may be volatile or non-volatile memory, and may also be secure and/or encrypted memory, or unsecure and/or unencrypted memory, or any combination thereof. The touchscreen controller 604 and the processor 602 may also be coupled to a touchscreen panel 612, such as a resistive-sensing touchscreen, capacitive-sensing touchscreen, infrared sensing touchscreen, etc. Additionally, the display of the wireless communication device 600 need not have touch screen capability.

The wireless communication device 600 may have one or more cellular network transceivers 608a, 608b coupled to the processor 602 and to at least one antenna 610 and configured for sending and receiving cellular communications. The transceivers 608a, 608b and antenna 610 may be used with the above-mentioned circuitry to implement the various example methods. The cellular network transceivers 608a, 608b may be the RF resource 218. The antenna 610 may be the antenna 220. The wireless communication device 600 may include two or more SIM cards 616a, 616b, corresponding to SIM-1 204a (the first SIM) and SIM-2 204b (the second SIM), coupled to the transceivers 608a, 608b and/or the processor 602. The wireless communication device 600 may include a cellular network wireless modem chip 611 (e.g., the baseband modem processor 216) that enables communication via at least one cellular network and is coupled to the processor 602.

The wireless communication device 600 may include a peripheral device connection interface 618 coupled to the processor 602. The peripheral device connection interface 618 may be singularly configured to accept one type of connection, or multiply configured to accept various types of physical and communication connections, common or proprietary, such as USB, FireWire, Thunderbolt, or PCIe. The peripheral device connection interface 618 may also be coupled to a similarly configured peripheral device connection port (not shown).

The wireless communication device 600 may also include speakers 614 for providing audio outputs. The wireless communication device 600 may also include a housing 620, constructed of a plastic, metal, or a combination of materials, for containing all or some of the components discussed herein. The wireless communication device 600 may include a power source 622 coupled to the processor 602, such as a disposable or rechargeable battery. The rechargeable battery may also be coupled to a peripheral device connection port (not shown) to receive a charging current from a source external to the wireless communication device 600. The wireless communication device 600 may also include a physical button 624 for receiving user inputs. The wireless communication device 600 may also include a power button 626 for turning the wireless communication device 600 on and off.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present examples.

The hardware used to implement the various illustrative logics, logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present examples. Various modifications to these examples will be readily apparent to those skilled in the art, and the generic principles defined herein may be applied to some examples without departing from the spirit or scope of the examples. Thus, the present examples are not intended to be limited to the examples shown herein but are to be accorded the widest scope consistent with the following claims and the principles and novel features disclosed herein.

What is claimed is:

1. A method for managing connection of a wireless communication device, comprising:
   receiving, by the wireless communication device, a call setup page from a network while in a connected mode;
   determining whether a data inactivity duration exceeds a threshold upon receiving the call setup page, wherein a value of the threshold is based on whether the wireless communication device is a multi-Subscriber Identity Module (SIM) wireless communication device, a Concurrent Radio Access Technology (CRAT) wireless communication device, or a single-SIM wireless communication device;
   setting the call setup page as FALSE in response to determining that the data inactivity duration does not exceed the threshold;
   transmitting a Scheduling Request (SR) probe to the network in response to determining that the data inactivity duration exceeds the threshold;
   determining whether an uplink grant corresponding to the SR probe has been received; and
   performing a local connection release in response to determining that the uplink grant corresponding to the SR probe has not been received.

2. The method of claim 1, further comprising:
   storing the call setup page in response to determining that the data inactivity duration exceeds the threshold; and
   performing a call setup procedure based on the stored call setup page in response to determining that an uplink grant has not been received.

3. The method of claim 2, wherein:
   the call setup page is a Circuit Switch (CS) page; and
   the call setup procedure is at least one of a Circuit-Switch Fallback (CSFB) call procedure or Voice-over-LTE (VoLTE) call procedure.

4. The method of claim 1, further comprising setting the call setup page as FALSE in response to determining that an uplink grant corresponding to the SR probe has been received.

5. The method of claim 1, further comprising setting a SR count as a new SR count in response to transmitting the SR probe.

6. The method of claim 1, wherein:
   the wireless communication device is the multi-SIM wireless communication device or the CRAT wireless communication device;
   the wireless communication device has a first RAT associated with a first network and a second RAT associated with a second network;
   the call setup page is associated with the first RAT; and
   the network is the first network.

7. The method of claim 6, further comprising:
   tuning away from the first RAT to the second RAT;
   tuning back from the second RAT to the first RAT; and
   receiving the call setup page from the first network after tuning back from the second RAT.

8. The method of claim 7, further comprising failing to receive a connection release Over-the-Air (OTA) message from the first network while the wireless communication device is tuned away to the second RAT.

9. The method of claim 1, wherein the wireless communication device is the single-SIM wireless communication device, and the method further comprising failing to receive a connection release OTA message from the network due to interference or fading.

10. The method of claim 1, wherein:
    determining whether the data inactivity duration exceeds the threshold comprises checking, with a Radio Resource Control (RRC) layer, the data inactivity duration maintained by a Media Access Control (MAC) layer; and
    transmitting the SR probe comprises configuring, with the MAC layer, a Radio Frequency (RF) resource to send the SR probe.

11. The method of claim 1, further comprising:
    caching, by a Radio Resource Control (RRC) layer, the call setup page in response to determining that the data inactivity duration exceeds the threshold;
    forwarding, by the RRC layer, the call setup page to a Non-Access Stratum (NAS) layer; and
    configuring, by the NAS layer, a Radio Frequency (RF) resource to perform a call setup procedure.

12. A wireless communication device, comprising:
    a Radio Frequency (RF) resource;
    a memory; and
    a processor configured to:
    receive a call setup page from a network while in a connected mode; transmit a Scheduling Request (SR) probe to the network in response to determining that a data inactivity duration exceeds a threshold upon receiving the call setup page, wherein a value of the threshold is based on whether the wireless communication device is a multi-Subscriber Identity Module (SIM) wireless communication device, a Concurrent Radio Access Technology (CRAT) wireless communication device, or a single-SIM wireless communication device; and
    set the call setup page as FALSE in response to determining that the data inactivity duration does not exceed the threshold; and
    perform a local connection release in response to determining that an uplink grant corresponding to the SR probe has not been received.

13. The wireless communication device of claim 12, wherein the processor is further configured to:
    store the call setup page in response to determining that the data inactivity duration exceeds the threshold; and
    perform a call setup procedure based on the stored call setup page in response to determining that an uplink grant has not been received.

14. The wireless communication device of claim 13, wherein:
    the call setup page is a Circuit Switch (CS) page; and
    the call setup procedure is at least one of a Circuit-Switch Fallback (CSFB) call procedure or Voice-over-LTE (VoLTE) call procedure.

15. The wireless communication device of claim 12, wherein the processor is further configured to set the call setup page as FALSE in response to determining that an uplink grant corresponding to the SR probe has been received.

16. The wireless communication device of claim 12, wherein the processor is further configured to set a SR count as a new SR count in response to transmitting the SR probe.

17. The wireless communication device of claim 12, wherein:
    the wireless communication device is the multi-SIM wireless communication device or the CRAT wireless communication device;

the wireless communication device further comprises a first SIM associated with a first RAT of a first network and a second SIM associated with a second RAT of a second network;
the call setup page is associated with the first RAT; and the network is the first network.

18. The wireless communication device of claim 17, wherein the processor is further configured to:
tune away from the first RAT to the second RAT;
tune back from the second RAT to the first RAT; and
receive the call setup page from the first network after tuning back from the second RAT.

19. The wireless communication device of claim 18, wherein a connection release Over-the-Air (OTA) message from the first network has not been received by the RF resource while the wireless communication device is tuned away to the second RAT.

20. The wireless communication device of claim 12, wherein the wireless communication device is the single-SIM wireless communication device, and a connection release OTA message from the network has not been received by the RF resource due to interference or fading.

21. The wireless communication device of claim 12, wherein the processor is configured to:
determine whether the data inactivity duration exceeds the threshold; and
determine whether the uplink grant corresponding to the SR probe has been received, by checking, with a Radio Resource Control (RRC) layer implemented by the processor, the data inactivity duration maintained by a Media Access Control (MAC) layer implemented by the processor; and
transmit, via the RF resource configured by the MAC layer, the SR probe.

22. The wireless communication device of claim 12, the processor is further configured to:
cache, by a Radio Resource Control (RRC) layer implemented by the processor, the call setup page in response to determining that the data inactivity duration exceeds the threshold;
forward, by the RRC layer, the call setup page to a Non-Access Control (NAS) layer implemented by the processor; and
configure the RF resource, with the NAS layer, to perform a call setup procedure.

23. A wireless communication device, comprising:
means for receiving a call setup page from a network while in a connected mode;
means for transmitting a Scheduling Request (SR) probe to the network in response to determining that a data inactivity duration exceeds a threshold upon receiving the call setup page, wherein a value of the threshold is based on whether the wireless communication device is a multi-Subscriber Identity Module (SIM) wireless communication device, a Concurrent Radio Access Technology (CRAT) wireless communication device, or a single-SIM wireless communication device; and
means for setting the call setup page as FALSE in response to determining that the data inactivity duration does not exceed the threshold; and
means for performing a local connection release in response to determining that an uplink grant corresponding to the SR probe has not been received.

24. A non-transitory computer-readable medium containing processor-readable instructions such that, when executed, causes a processor of a wireless communication device to:
receive, by the wireless communication device, a call setup page from a network while in a connected mode;
determine whether a data inactivity duration exceeds a threshold upon receiving the call setup page, wherein a value of the threshold is based on whether the wireless communication device is a multi-Subscriber Identity Module (SIM) wireless communication device, a Concurrent Radio Access Technology (CRAT) wireless communication device, or a single-SIM wireless communication device;
set the call setup page as FALSE in response to determining that the data inactivity duration does not exceed the threshold;
transmit a Scheduling Request (SR) probe to the network in response to
determining that the data inactivity duration exceeds the threshold;
determine whether an uplink grant corresponding to the SR probe has been received; and
perform a local connection release in response to determining that the uplink grant corresponding to the SR probe has not been received.

* * * * *